(12) United States Patent
Orloff et al.

(10) Patent No.: US 10,496,610 B2
(45) Date of Patent: Dec. 3, 2019

(54) SELF DESTRUCTING PORTABLE ENCRYPTED DATA CONTAINERS

(71) Applicant: Code 42 Software, Inc., Minneapolis, MN (US)

(72) Inventors: Rick Scott Orloff, Castro Valley, CA (US); Thomas Anthony Lindquist, Minnetonka, MN (US)

(73) Assignee: Code 42 Software, Inc., Minneapolis, MN (US)

( * ) Notice: Subject to any disclaimer, the term of this patent is extended or adjusted under 35 U.S.C. 154(b) by 102 days.

(21) Appl. No.: 15/451,621

(22) Filed: Mar. 7, 2017

(65) Prior Publication Data

US 2018/0260578 A1    Sep. 13, 2018

(51) Int. Cl.
*H04L 29/06* (2006.01)
*G06F 16/182* (2019.01)
*G06F 21/62* (2013.01)

(52) U.S. Cl.
CPC ........ *G06F 16/182* (2019.01); *G06F 21/6209* (2013.01); *H04L 63/0428* (2013.01); *G06F 2221/2137* (2013.01); *G06F 2221/2143* (2013.01)

(58) Field of Classification Search
CPC .............. H04L 63/065; H04L 63/0869; H04L 63/0823; H04L 63/0428; H04L 9/0833; G06F 21/60
See application file for complete search history.

(56) References Cited

U.S. PATENT DOCUMENTS

| | | | |
|---|---|---|---|
| 8,788,816 B1 * | 7/2014 | Spaulding | G06F 21/10 713/165 |
| 9,432,369 B2 | 8/2016 | Cismas et al. | |
| 9,807,135 B1 * | 10/2017 | Hansen | G06F 3/0482 |
| 9,946,585 B1 * | 4/2018 | Wookey | G06F 11/00 |
| 2005/0262361 A1 * | 11/2005 | Thibadeau | G06F 21/80 713/193 |
| 2007/0242824 A1 * | 10/2007 | Vishik | G06F 21/10 380/200 |
| 2008/0219453 A1 * | 9/2008 | Chang | H04L 9/0897 380/286 |
| 2009/0100268 A1 * | 4/2009 | Garcia | G06F 21/6209 713/184 |
| 2010/0306283 A1 * | 12/2010 | Johnson | G06F 17/30085 707/803 |

(Continued)

*Primary Examiner* — Jeffrey C Pwu
*Assistant Examiner* — William A Corum, Jr.
(74) *Attorney, Agent, or Firm* — Schwegman Lundberg & Woessner, P.A.

(57) ABSTRACT

Disclosed in some examples are methods, systems, and machine readable mediums which provide for encrypted file system element containers which secure sensitive file system elements. The encrypted file system element containers are sent from a network based file storage system upon selection of file system elements for a network based file download and stored in a user's computing device in an encrypted state while the data is at rest. An application on the user's computing device may provide access to the file system elements (e.g., files, directories, and the like) inside the encrypted file system element containers according to a set of one or more access rules. Example access rules include a time-to-live (TTL) rule that deletes or causes the encrypted file system element containers to be inaccessible after a predetermined amount of time.

15 Claims, 8 Drawing Sheets

(56) References Cited

U.S. PATENT DOCUMENTS

| | | | |
|---|---|---|---|
| 2011/0055559 A1* | 3/2011 | Li | G06F 21/6218 713/165 |
| 2011/0302410 A1* | 12/2011 | Clarke | H04L 9/0872 713/155 |
| 2013/0145178 A1* | 6/2013 | Jeffries | G06F 21/6209 713/193 |
| 2013/0268740 A1* | 10/2013 | Holt | G06F 21/00 711/163 |
| 2015/0169896 A1* | 6/2015 | Lin | G06F 21/6227 713/165 |
| 2015/0339497 A1* | 11/2015 | Kurian | G06F 21/78 726/34 |
| 2017/0116431 A1* | 4/2017 | Lee | G06F 21/604 |
| 2018/0024942 A1* | 1/2018 | Canepa | G06F 12/1408 713/193 |
| 2018/0069844 A1* | 3/2018 | Cignetti | H04L 63/0428 |

* cited by examiner

SELF DESTRUCTING PORTABLE ENCRYPTED DATA CONTAINERS

TECHNICAL FIELD

Embodiments pertain to encrypted data containers. Some embodiments relate to encrypted data containers usable in accordance with permission sets.

BACKGROUND

Network-based file backup and file sharing services offer users convenient network-based access to their important file system elements (e.g., files, directories, and the like). These services may backup a user's files from their local computing devices to storage devices at remote locations managed by the services. The services may also provide web-page based Graphical User Interfaces (GUIs) that allow users to see their available files and select one or more of these files to download to their local computing device. Furthermore, some services synchronize a user's files across multiple computing devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
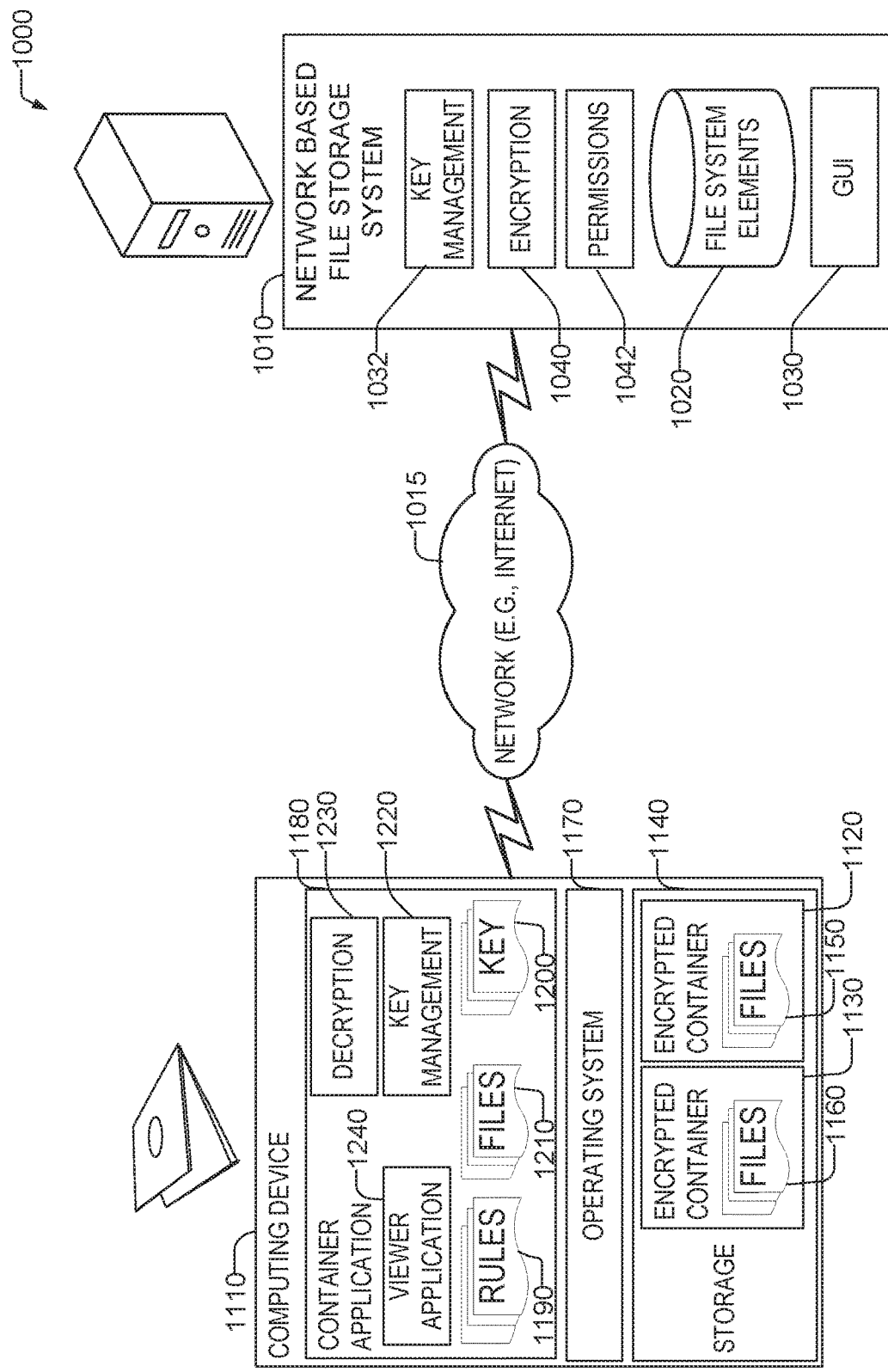
FIG. 1 shows a system for providing secure network-based file storage according to some examples of the present disclosure.

Network-based file downloading from file backup and file sharing services, while convenient, may raise potential security and regulatory compliance issues. For example, sensitive data may be downloaded to an unsecured computing device. These computing devices may be mobile (e.g., tablets, laptops, smartphones) and thus more easily stolen, misplaced, or lost. Verizon estimated that in 2015 stolen computing devices accounted for 45% of all healthcare data breaches. While administrators can often help the situation on corporate computing devices by enabling encryption and other data protection tools, the proliferation of Bring Your Own Devices (BYOD) and sharing or borrowing devices often means that the devices on which corporate data is being stored or temporarily accessed, are out of the control of corporate network administrators and security teams. Furthermore, even careful employees often leave breadcrumbs of sensitive data behind without being aware. For example, the popular word processing program, Microsoft Word, automatically saves recovery files without user knowledge and those recovery files are placed in a different directory. A sophisticated thief with access to the computing device may utilize these recovery files and other cached versions to recover the document even if the original is deleted.

The consequences of data breaches are severe and costly. For example, for healthcare data violations the Health Insurance Portability and Accountability Act (HIPAA) is used by Health and Human Services (HHS) to penalize organizations that have even inadvertent data breaches. Some recent settlements between HHA and healthcare organizations include $5.5 million, $4.8 million, $4.3 million, and $3.5 million. Moreover, the costs incurred by those individuals whose personal information is compromised is also high. Identity theft and other crimes are estimated by Javelin Strategy & Research to have resulted in $15 billion stolen from U.S. consumers in 2015 alone.

Disclosed in some examples are methods, systems, and machine readable mediums which provide for encrypted file system element containers which secure sensitive file system elements. The encrypted file system element containers are sent from a file storage system upon selection of file system elements for a network based file download and stored in a user's computing device in an encrypted state while the data is at rest. An application on the user's computing device may provide access to the file system elements (e.g., files, directories, and the like) inside the encrypted file system element containers according to a set of one or more access rules. Example access rules include a time-to-live (TTL) rule that deletes or causes the encrypted file system element containers to be inaccessible after a predetermined amount of time. The predetermined amount of time may vary based upon the individual accessing the information, the sensitivity of the files, the type of computing device (e.g., a desktop vs. laptop, home vs. work, etc.) or the like. Other access rules include file system permissions for the various files (e.g., read permissions, print permissions, or write permissions), whether the user is allowed to store the file system elements unencrypted, or the like. In some examples, to prevent cached copies or other unintentional breadcrumbs, the application that accesses the encrypted file system element containers may either not create cached copies, or delete them at the conclusion of the user's session with the application or system logoff, restart, or crash.

Turning now to FIG. 1, a system 1000 for providing secure network based file storage is shown according to some examples of the present disclosure. Network based file storage system 1010 may include a file system elements data store 1020 that may store one or more file system elements. In some examples, the network based file storage system may be a "cloud storage" system. These file system elements may be uploaded to the network based file storage system by one or more computing devices, e.g., computing device 1110. For example, an application (in some examples, the container application 1180 or in other examples, a different application) may automatically scan one or more configured locations (e.g., directories or folders) of storage device 1140 of computing device 1110 for any new or modified file system elements and if any new or modified file system elements are detected, it may automatically upload the new or modified file system element (or data describing the new or modified file system element) to the network based file storage system 1010. File system elements may include files, directories, folders, metadata, and the like. In other examples, users of the computing devices may manually upload one or more file system elements to network based file storage system 1010 through one or more GUIs provided by network based file storage system 1010 or a local application on their computing device.

File system elements may be stored on behalf of one or more users using one or more computing devices. Users may have access only to file system elements stored in the file system elements data store 1020 that they have been given permission to access. For example, users may login to the network based file storage system 1010 using login credentials (username/passwords) that identify them to the network based file storage system 1010. The network based file storage system 1010 may only show file system elements to which the authenticated user has been given permission to view e.g., by virtue of the file system elements being uploaded or owned by the user, or by virtue of another user giving the authenticated user access. Likewise, the network based file storage system 1010 may also only allow users to upload or download file system elements if they have the appropriate permissions.

Network based file storage system may include a Graphical User Interface (GUI) component 1030 which may provide one or more graphical user interfaces (GUI). For example, the GUI component 1030 may provide a GUI by sending a computing device (such as computing device 1110) one or more GUI descriptors. GUI descriptors may include one or more Hypertext Markup Language (HTML) documents, eXtensible Markup Language (XML) documents, Content Style Sheets (CSS) documents, JavaScript documents, scripting documents, or the like. The recipient computing device may render or cause to be rendered the GUI descriptors to create a GUI, for example, by a general purpose application such as an Internet browser. In other examples, the computing device executes a dedicated application (e.g., an application specific to the network based file storage system) which utilizes information in one or more GUI descriptors to populate one or more GUI screens.

In some examples the GUI component 1030 provides a GUI that allows users to view file system elements stored in file system elements data store 1020 that they have permission to access (e.g., files they store there or that other users have given them access to or that they have access to by virtue of their privilege level). In some examples, the GUI component 1030 provides the ability for users to upload and/or download one or more of the file system elements that they have permission to access. For example, as part of an encrypted file system element container.

In some examples, upon selecting files to download, the GUI component may determine the user's permissions with respect to those file system elements via the permissions component 1042. The permissions component 1042 may store, manage, and check permissions of one or more users with respect to each of one or more file system elements stored in the file system elements data store 1020. Permissions may specify restrictions on access, viewing, downloading, and usage of the file system element. Permissions may also be granular enough to allow some types of downloading (e.g., a restore of all file system elements from file system elements data store 1020) and prohibit or restrict other types (e.g., network based downloads of individual file system elements). For example, a permission may specify that a particular file may be downloaded as part of a full restore but may only be downloaded from a network based download if it is part of an encrypted file system element container.

If the permissions do not allow a requested user action, the user may be informed via a GUI provided by the GUI component 1030 that they are not allowed to perform the action on the file system element. In some examples, the permissions may allow the user to download the file system element without restrictions. In that case, the user may download the file system element directly. In still other examples, the permissions may specify that the file system element is only allowed to be downloaded as part of an encrypted file system element container. The permissions may also determine access rules that put usage restrictions of the encrypted file system element container. Example access rules include a TTL that specifies when the encrypted file system element container will be automatically removed from the computing device. Other example usage rules include whether the user may store the file unencrypted outside the encrypted filesystem container, and the like. As an example, a permission for a file system element may be that the file may be downloaded during a network based download only as part of an encrypted file system element container with a TTL of five days and a key life of 3 days, with an option to re-download the key from the network based file storage system 1010 once.

When the encrypted file system element container is created, the permissions of the file system elements that make up the file system element container are utilized to determine the access rules of the file system element container. In some examples, each file system element may be placed in a separate file system element container. In other examples, multiple file system elements may be grouped into a single file system element container. In these examples, it is possible that different file system elements have different permissions. When resolving conflicts between different permissions, the network based file storage system may group file system elements with the same permissions and create a different encrypted file system element containers for each group. Thus, each element in the encrypted file system element container may have the same permissions, and the access rules may be derived directly from the permissions of the group. In other examples, the access rules for a file system element container may be set as the most restrictive permission set of all the file system elements.

If the file system element permissions specify that the user is to download the file system element as part of an encrypted file system container, the key management component 1032 may create and store an encryption key. This encryption key may be utilized by the encryption component 1040 to encrypt the encrypted file system element container. This key may have one or more properties, such as an expiration time that may be determined by the file system element permissions as described previously. After the expiration time, the key is automatically deleted by the computing device and to access the encrypted file system element container, the computing device (e.g., computing device 1110) will have to contact the network based file storage system 1010 to re-obtain a key. Key management component 1032 may also manage one or more public and private keys of the network based file storage system. The private key may be utilized to sign the key to the encrypted file system element container in order to allow the computing device 1110 to verify that the encryption key is valid and the encrypted container is trusted. Permissions and other properties of the encrypted file system element container may be included in the encrypted file system element container or may be sent separately.

An encrypted file system element container may be a file system element container (such as a folder) whose contents is encrypted and that contains one or more other file system elements. This encrypted file system element is then sent to the computing device 1110. In some examples, the encrypted file system element container is not openable by the operating system of the computing device 1110 (e.g., the use of a container application 1180 may be needed). One or more encrypted file system element containers (e.g., such as encrypted file system element containers 1120 and 1130) may be stored as part of a local file system in a storage device 1140 of the computing device 1110. As noted, these encrypted file system element containers may contain one or more file system elements 1150 and 1160. These file system elements include files, folders, directories, meta-data, and the like. Additionally the encrypted file system element containers (e.g., 1120 and 1130) may include access restrictions defining usage rights and restrictions on the file system elements. In other examples, the access rights may be sent separately from the encrypted file system element containers. Storage device 1140 may be any non-volatile storage of the computing device 1110. Examples include a hard disk drive (HDD), a solid state drive (SSD), a flash drive, and the like.

The computing device 1110 may include an operating system 1170. Operating system 1170 may provide one or more services to applications (e.g., container application 1180), such as task scheduling, memory management, event management, system clock, interrupt management, disk access and management, and other functions.

The computing device 1110 may include a container application 1180. Container application 1180 may be downloaded or installed by the user of the computing device 1110 separately or may be downloaded with, or be part of the encrypted file system element container. For example, the encrypted file system element container may be an executable that runs the container application and includes as a data portion of the executable the contents of the encrypted file system element container. The container application 1180 may communicate with the network based file storage system 1010 (e.g., by utilizing one or more standard protocols such as Hyper Text Transfer Protocol (HTTP), or by utilizing a proprietary protocol) and may display the GUIs provided by the GUI component 1030. These GUIs may allow users to select file system elements stored in file system elements data store 1020 for downloading, allow users to upload file system elements to file system elements data store 1020, and the like. Container application 1180 may transmit a request to download the selected file system elements to the network based file storage system 1010.

The container application 1180 may receive, in response to the request for one or more file system elements, one or more encrypted file system element containers (e.g., 1120 and 1130), along with the cryptographic key(s) 1200 needed to decrypt the encrypted file system element container. The encrypted file system element containers (e.g., 1120 and 1130) may be stored encrypted when stored in non-volatile storage and may not be decrypt able by applications on the computing device 1110 other than container application 1180. In some examples, the communications over network 1015 may be secured using Transport Layer Security (TLS) or Secure Socket Layer (SSL).

The cryptographic keys may be securely stored by the container application 1180. In some examples, cryptographic keys 1200 may be stored in storage device 1140. In some examples, the cryptographic keys 1200 may be encrypted by a password of a user of the computing device 1110. The password may be entered upon requesting or receiving the encrypted file system element container (e.g., through a GUI). Upon requesting access to the encrypted file system element container, the container application may request the password from the user (e.g., through a GUI). Upon supplying the password, the container application 1180 may decrypt the key needed to decrypt the encrypted file system element container. Cryptographic key(s) 1200 may include one or more properties, such as an expiration time. Once the expiration time expires, the container application 1180 deletes the key. The properties may be sent by the network based file storage system 1010 along with the key (e.g., in some examples, as part of a digital signature of the network based file storage system 1010 to prevent tampering).

Container application 1180 determines access rules that relate to the encrypted file system element container that secures the files. For example, the access rules 1190 may be sent by the network based file storage system 1010 inside, or included with the encrypted file system element containers. For example, an access rule may specify a TTL for the encrypted file system element container. In that case, the container application 1180 may set an event (e.g., through operating system 1170) that triggers when the TTL expires. Upon receipt of the event trigger, the container application 1180 may delete the encrypted file system element container from the computing device's storage device 1140.

Likewise the access rules may be stored and checked when the user attempts to access the encrypted file system element containers to determine if the user has permission to open the file system element containers. For example, the access rules may include authorized user lists. If the operation the user is trying to perform is permitted by the access rules, the user is allowed to take the action, otherwise the user is denied. For example, if the user has permission to open the encrypted file system element container the encrypted file system element containers may be decrypted within the container application 1180 (at rest, the data remains in the encrypted file system element containers) and stored in the memory utilized by the container application 1180. This is shown in FIG. 1 as file system elements 1210.

Key management component 1220 may perform one or more of: record, track, store, delete, and manage encryption keys received with encrypted file system element containers. Key management component 1220 may obtain a password from the user, store the encryption keys in memory and/or storage device 1140, encrypt the encryption keys using the user supplied password(s), decrypt the encryption keys using the user supplied password(s) (e.g., for the decryption component 1230 to use to decrypt the encrypted file system element container), and the like. As noted, in some examples, keys may have validity expiry times which may be different than the TTL of the encrypted file system element container that the key unlocks. If the key expires prior to the encrypted file system element container, the key management component 1220 may attempt to re-obtain the key by communicating over a network with network based file storage system 1010.

Having a key expire before the encrypted file system element container TTL expires allows for more flexibility while saving bandwidth. Short TTLs for encrypted file system element containers increase the control the file owner or organization has over the files, however, should the TTL expire before the user is finished, it will cause the user to re-download the encrypted file system element container. This wastes bandwidth. However, having a long TTL may be an unacceptable security risk. Creating a key with a short validity time with a longer TTL for the encrypted file system element container it unencrypts provides tighter control but without wasting bandwidth as only the key may need to be retransmitted. Decryption component 1230 may load a copy of the encrypted file system element container into volatile memory and decrypt this copy in response to a user request to access a file system element inside an encrypted file system element container (e.g., using a GUI). The decryption component 1230 may not decrypt the copy in non-volatile storage. Decryption component 1230 may retrieve the key from the key management component 1220. In some examples, if the access rules allow it, the unencrypted file system elements may then be stored, opened, edited, and otherwise treated as a normal file by the user. In other examples, the access rules may limit these operations. In these examples, the user may only be able to open these file system elements in a special viewer application 1240. Viewer application 1240 may prevent the user from making copies of the file, editing the file, and the like according to the access rules 1190. Viewer application 1240 may also refrain from making a temporary copy (e.g., a cached copy) or if it makes a temporary copy, it may automatically remove the temporary copy. Viewer application 1240 in some examples does not create a cached copy of the file system element that lasts beyond a viewing session of the user. A viewing session of the user may be defined as from file opening to when the file is either closed or the viewer application 1240 terminates execution (e.g., without first explicitly closing the file such as a forced close).

Viewer application 1240 may have the ability to view a number of different document types (e.g., Portable Document Format (PDF), word processing documents, spreadsheet documents, and the like). In other examples, a plurality of viewer applications 1240 may be available. In some examples, a plurality of viewer applications 1240 may be available for download by the computing device 1110 as plug-in modules to the container application 1180. These viewer applications may be part of the container application 1180 or may be separately downloaded. In some examples, the viewer applications may be third party applications which are designed to interact with the container application 1180 through defined inter-process communications (e.g., an Application Programmer Interface).

In some examples, network based file storage system 1010 may convert one or more of the file system elements to a type that it is compatible with the viewer application 1240 prior to creation of the encrypted file system element containers and include the converted version in the encrypted file system element container (either additional to the original version, or in place of the original version). For example, the network based file storage system 1010 may convert all documents to Portable Document Format (PDF) documents and the viewer application 1240 may be compatible with PDF documents. In some examples, the network based file storage system 1010 may determine the viewer application appropriate for the file elements in the encrypted file system element containers and transfer those applications as part of the encrypted file system element containers or separately at the time that the encrypted file system element containers are transferred to the computer system.

While in FIG. 1 the encrypted file system element containers were readable by the container application 1180 executing using operating system 1170, in other examples, the encrypted file system element containers may be an executable virtual machine. For example, the encrypted file system element containers may contain the file system elements as part of a complete filesystem, operating system, viewer components, system libraries, and the like. The encrypted file system element containers are then executable by the operating system and create a virtual machine that may operate isolated from other processes on the computing device. In these examples, the standard programs (e.g., MICROSOFT® WORD®, ADOBE® PDF®) may be loaded as part of the encrypted file system element containers. Cached versions of the documents may then be tracked and removed prior to exiting the virtual machine. In other examples, rather than providing a full virtual machine, the encrypted file system element containers may be lighter weight software containers, such as Linux Containers (LXC), DOCKER® containers, or the like. These containers operate in separate kernel namespaces that isolate one container from another. Isolation in terms of containerized or virtual machine encrypted file system element containers includes file system and/or memory isolation.

In the above examples in which the encrypted file system elements are virtual machines or containerized software the network based file storage system 1010 may create a custom encrypted file system element container for the execution environment (e.g., processor, operating system) of the computing device 1110 as well as for the types of file system elements in the container (e.g., if WORD documents are include, MICROSOFT WORD® would be loaded into the encrypted file system element container).

Figure 2:
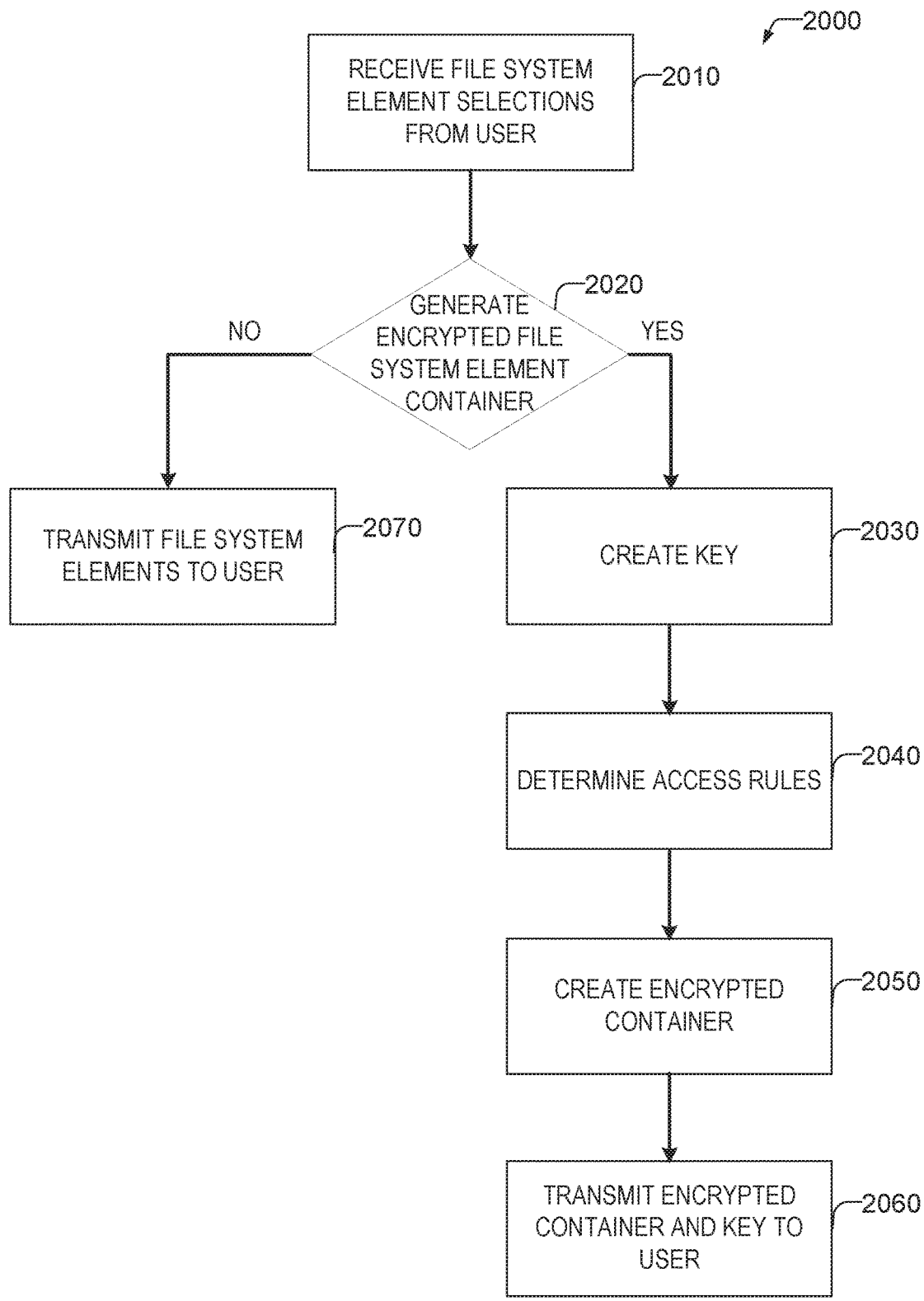
FIG. 2 shows a flowchart of a method of a network based file storage system providing an encrypted file system element container according to some examples of the present disclosure.

Turning now to FIG. 2 a method 2000 of a network based file storage system (e.g., such as a network based file storage system 1010 of FIG. 1) providing an encrypted file system element container is shown according to some examples of the present disclosure. At operation 2010 the network based file storage system may receive a file element selection from the user. For example, the user may be trying to download one or more files. The network based file storage system may provide one or more GUI descriptors to facilitate the selection of the file system elements. At operation 2020 the network based file storage system may determine whether to generate an encrypted file system element container. For example, the network based file storage system may consult the file permissions of the selected file system elements. If multiple file system elements are selected and some file system elements restrict downloads to encrypted file system element containers and some do not, the system may transmit those files that do not restrict downloads to encrypted file system element containers at operation 2070. The system may then continue with operation 2030 for those file system elements that do restrict downloads to encrypted file system element containers. In other examples, if a single file that was selected restricts downloads to encrypted file system element containers then all file system elements may be part of an encrypted file system element container.

As previously noted, the file system element permissions may vary based upon the user, file owner, file contents, file tags (e.g., categories, folders, project identifier, and the like), and the like. Additionally, the permissions may vary based upon the type of computing device that is attempting to access the file system element. For example, a portable computing device may require an encrypted file system element container but a desktop may not. Permissions may also vary based upon which computing device is attempting to access the file system element. Certain computing devices (e.g., a home computer, an office computer) may be authorized to download the file system element without encryption, however, other computing devices may require it. Permissions may be based upon policies of an administrator (e.g., in a corporate setting). File system elements may be tagged (e.g., tagged as sensitive data, tagged with a project code, or the like) which may then have a permission set associated with that tag which informs the network based file storage system of the permissions. Permissions may be utilized by the network based file storage system to determine access rules of an encrypted file system element container.

If the file system elements are to be provided in an encrypted file system element container, then at operation 2030 a key is created. As noted previously, the key may have an expiry. The expiry may be determined by an administrator of the network based file storage system, an administrator of a company of the user, the owner of the file system element, or the like. At operation 2040 the access rules of the encrypted file system element are determined. As previously noted, this may be based upon the permissions of the file system elements selected for inclusion in the encrypted file system element.

At operation 2050, the encrypted file system element container may be created using the key created in operation 2030. As also noted previously, the container may one or more of: contain the file system elements, contain applications (e.g., viewer applications), be an executable virtual machine instance, a software container, or the like. At operation 2060 the encrypted file system element container and access key may be transmitted to the computing device of the user. Additionally, the encrypted file system element container may contain the determined access rules or may be transmitted separately. Furthermore, the key may be transmitted separately. In some examples, the communication between the network based file storage system and the computing device of the user may be secured cryptographically, such as through a TLS or SSL connection.

Figure 3:
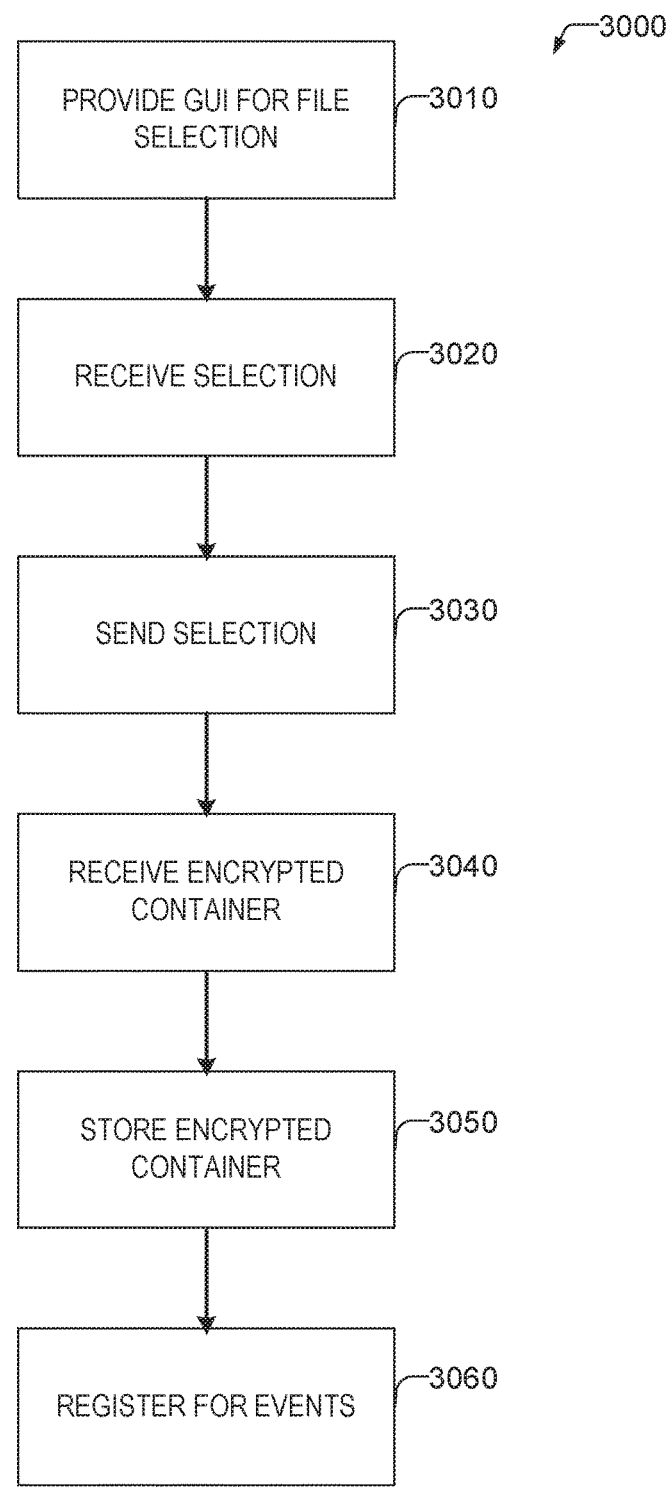
FIG. 3 shows a flowchart of a method of a computing device of the user selecting file system elements and receiving an encrypted file system element container according to some examples of the present disclosure.

Turning now to FIG. 3 a method 3000 of a computing device of the user selecting file system elements and receiving an encrypted file system element container is shown according to some examples of the present disclosure. At operation 3010 the computing device (e.g., computing device 1110 of FIG. 1) provides a GUI for file selection. This GUI may result from GUI descriptors sent from network based file storage system (e.g., network based file storage system 1010). At operation 3020 the computing device of the user may receive the user's selections of the file system elements (e.g., via the GUI). At operation 3030 the computing device may send, over a communications network (e.g., network 1015), the selections to the network based file storage system.

At operation 3040 the computing device receives the encrypted file system element container. As part of this operation, the computing device may receive the decryption key, key properties, and encrypted file system element access rules. At operation 3050 the encrypted file system element container may be stored in non-volatile storage. Additionally, decryption key, key properties, and encrypted file system element container access rules may also be stored in non-volatile storage. In some examples, the key and/or key properties may be encrypted when stored in non-volatile storage (e.g., with a passphrase).

At operation 3060, the container application may register for one or more events corresponding to the access rules if applicable. For example, a TTL may be determined from the access rules and an expiry event may be set. Once a TTL event is triggered, the container application (e.g., container application 1180) may delete the encrypted file system element container. Additionally, if an expiry is determined for the key (e.g., through metadata included with the key), the container application may register a key expiry event. Once a key expiry event is triggered, the container application (e.g., container application 1180) may delete the key.

Figure 4:
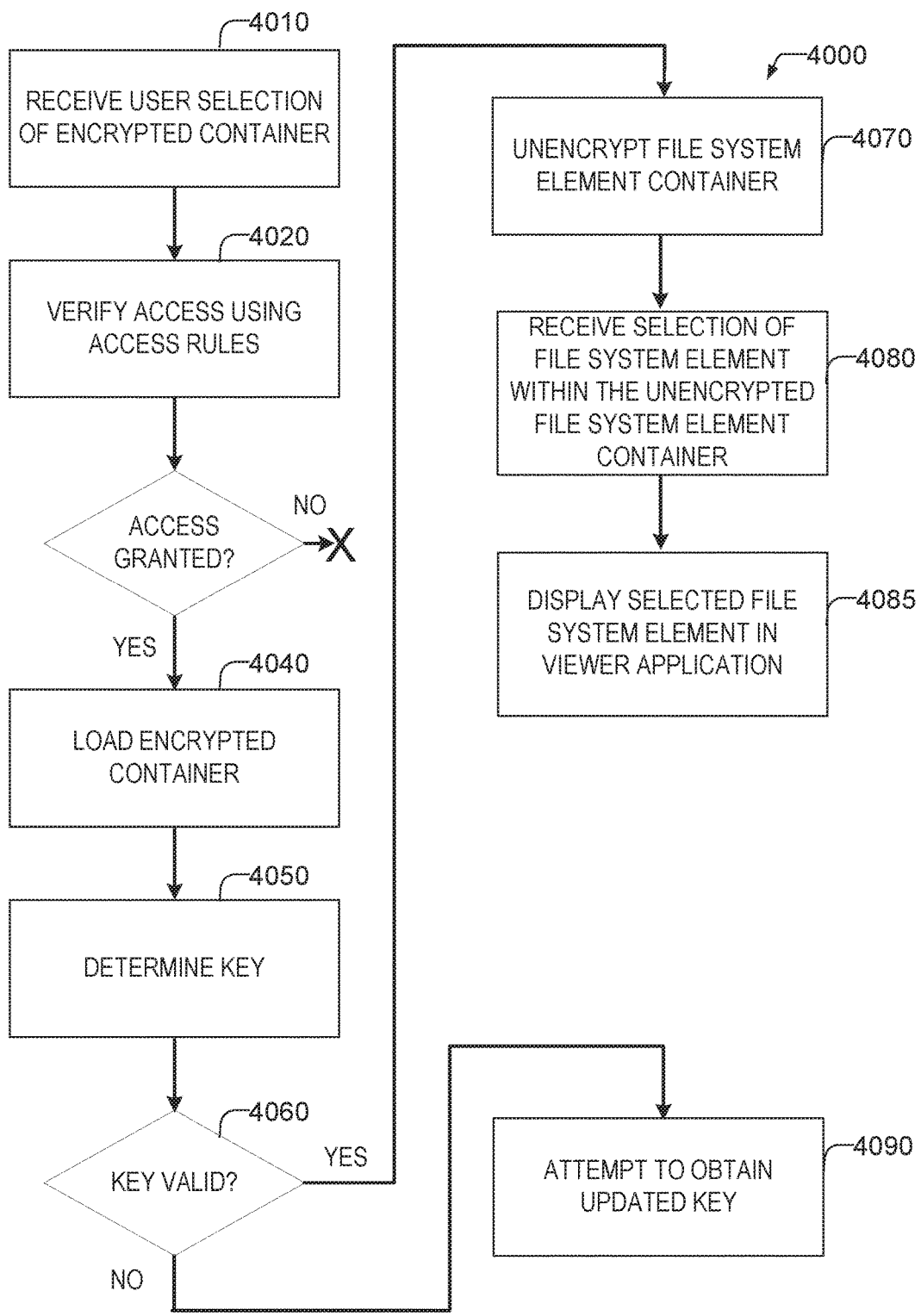
FIG. 4 shows a flowchart of a method of a container application opening an encrypted file system element container according to some examples of the present disclosure.

FIG. 4 shows a flowchart of a method 4000 of a container application 1180 opening an encrypted file system element container according to some examples of the present disclosure. At operation 4010 the container application may receive the user selection of the encrypted container. This selection may be made by the user in an operating system provided GUI or other UI. The operating system may then call the container application and pass the selected file system element encrypted container to the container application. In other examples, the user may select the file system element encrypted container from a GUI provided by the container application.

At operation 4020 the container application may verify that the user has permission to open the container based upon the access rules of the encrypted file system element container. For example, certain containers may restrict the users which have permission to open the container. In other examples, the access rules may specify specific times, or specific circumstances (e.g., the computing device must be on a secure network) for access, or the like. If access is not granted, then processing may end. If access is granted then at operation 4040 the container application may load the encrypted file system element container into volatile storage (if it had not already been loaded).

At operation 4050 the container application may determine the appropriate decryption key. As part of this operation, the user may be prompted for and enter their password to decrypt the key stored in non-volatile storage. This password may then be utilized to decrypt the key. At operation 4060 the validity of the key is assessed. For example, the key may be expired. If the key is expired, the container application may attempt to obtain an updated key from the network based file storage system at operation 4090. If the container application is successful, then processing proceeds to operation 4070, otherwise processing ends (and the user may be informed via an error message). In some examples, if the container application is unsuccessful in retrieving the key at operation 4090 the container application may delete the encrypted file system element container.

If the key is valid, at operation 4070 the encrypted file system element container may be decrypted. At operation 4080 the user may select one of the file system elements from the encrypted file system element container. For example, the container application may display the contents of the encrypted file system element container in a GUI and the user may select a file system element to view the contents. At operation 4085 the container application may pass the selected file system element to the viewer application for viewing. The container application may display the file system element.

Figure 5:
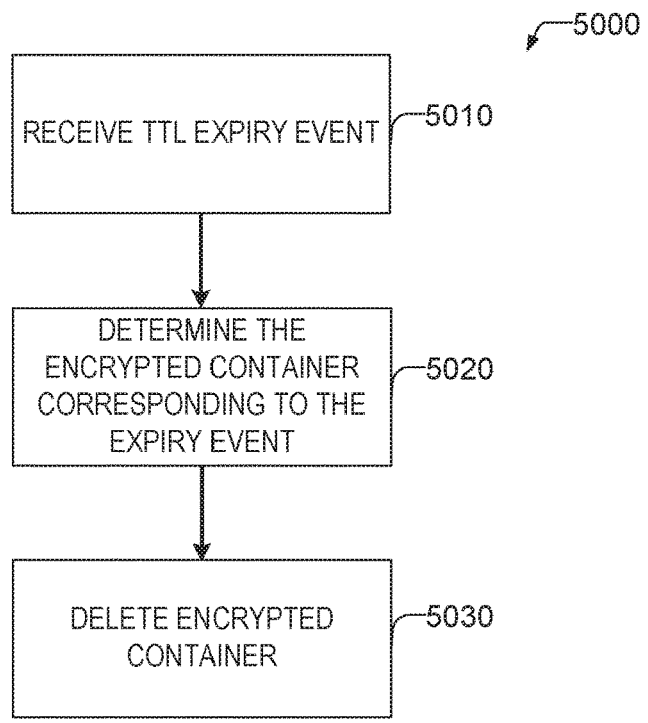
FIG. 5 shows a flowchart of a method of handling a TTL expiry event according to some examples of the present disclosure.

FIG. 5 shows a flowchart of a method of handling a TTL expiry event 5000 according to some examples of the present disclosure. At operation 5010 the container application may receive a TTL expiry event (e.g., from an operating system timer API). The TTL expiry event may determine the encrypted file system element container to which the expiry event applies at operation 5020. At operation 5020 the encrypted file system element container may be deleted from non-volatile storage of the computing device. In some examples, the container application may have taken a digital fingerprint of the encrypted file system element container upon receipt. The container application may then search all local non-volatile storage to determine if other copies are present and if other copies are present, those may also be deleted. In other examples, rather than fingerprinting the file, the container application may insert hooks into the operating system and may be notified anytime a file operation (e.g., move, copy, delete) occurs with respect to the encrypted file system element container and thus may track all file operations so that at operation 5020 it may delete all copies in every location it is found. In some examples, to permanently delete the encrypted file system element container, the container may be overwritten in volatile and/or non-volatile storage with a random number (and in some cases, multiple times to prevent digital forensics techniques from recovering it).

Figure 6:
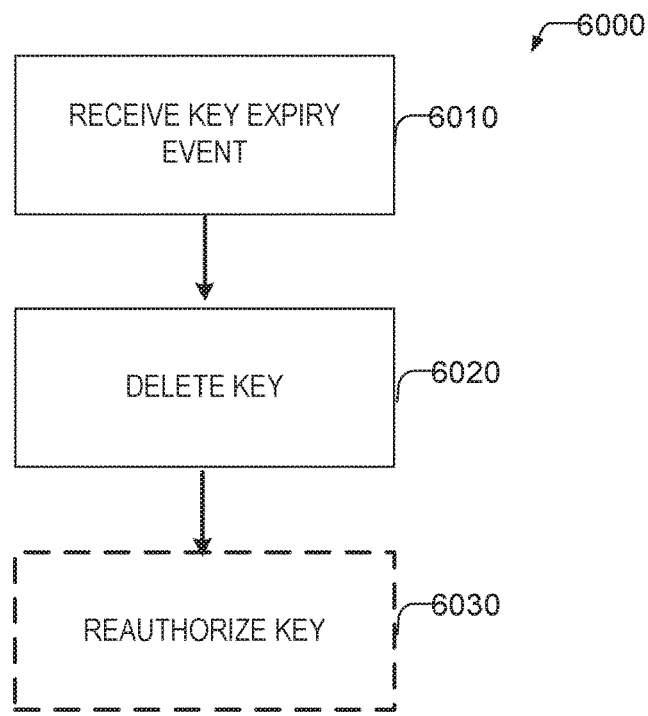
FIG. 6 shows a flowchart of a method of handling a key expiry event according to some examples of the present disclosure.

FIG. 6 shows a flowchart of a method 6000 of handling a key expiry event according to some examples of the present disclosure. At operation 6010 the container application may receive a key expiry event. The key expiry event may identify the encrypted file system element container key to which it applies. At operation 6020 the key may be deleted from volatile and/or non-volatile storage. In some examples, to permanently delete the key, the key may be overwritten in volatile and/or non-volatile storage with a random number (and in some cases, multiple times to prevent digital forensics techniques from recovering the key). In some examples, the container application may reauthorize the key at operation 6030. For example, the container application may contact the network based file storage system 1010 to re-receive the key.

Figure 7:
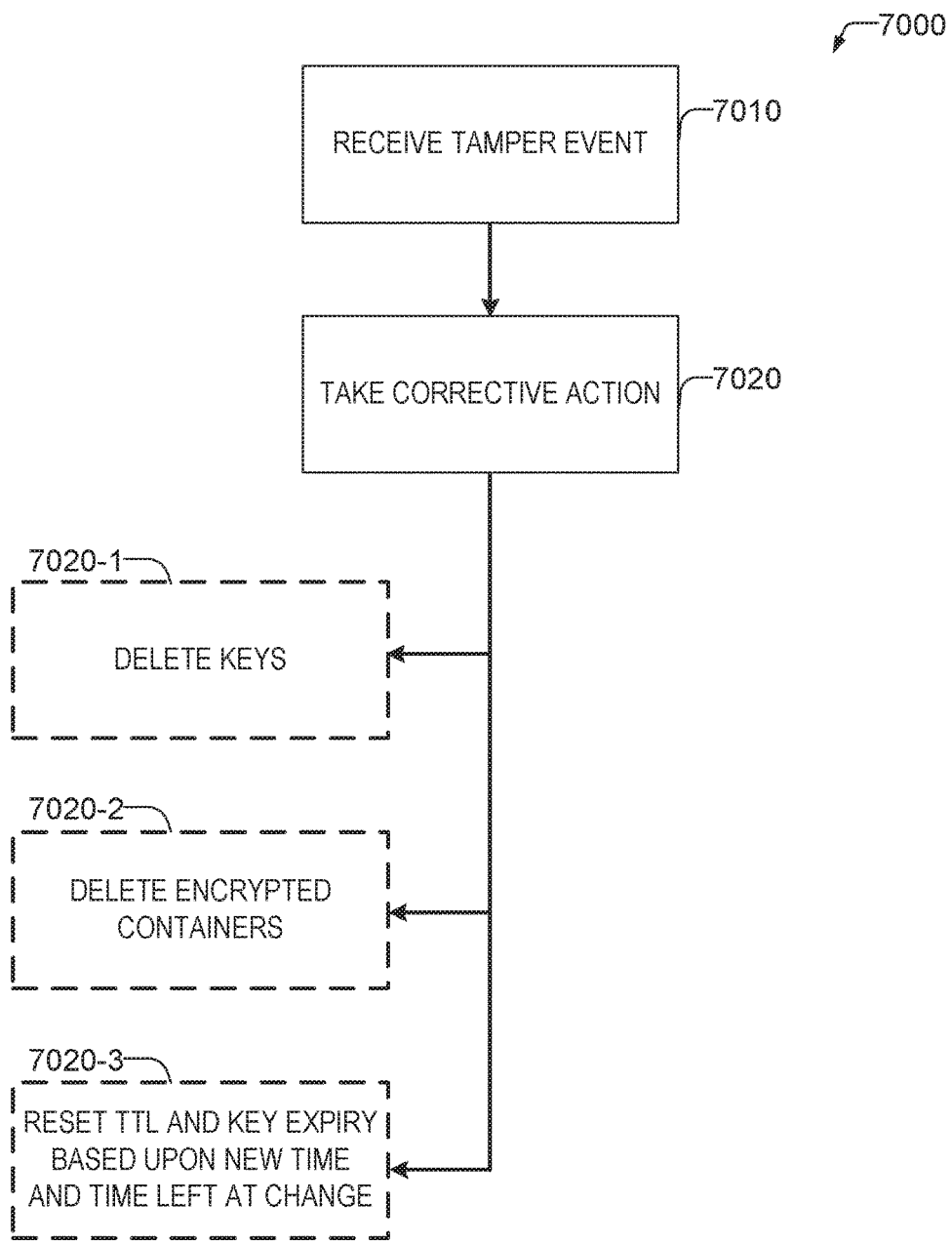
FIG. 7 shows a flowchart of a method of handling a tamper event according to some examples of the present disclosure.

FIG. 7 shows a flowchart of a method 7000 of handling a tamper event according to some examples of the present disclosure. In some examples, the container application may register with an operating system to receive certain events that indicate a desire to tamper with the system in an effort to circumvent the encryption and the various permissions. For example, if a user were to change the system clock in an effort to circumvent a TTL deletion or key expiry. At operation 7010 the container application may receive an event indicating an attempt at circumventing the encryption and the various permissions. At operation 7020, corrective action may be taken. For example, the keys of the encrypted file system element container may be deleted 7020-1, preventing access to the encrypted file system element container. In some examples, the container application may reauthorize with the network based file storage system and receive the key again. The network based file storage system may require appropriate access credentials and/or may place further restrictions on the encrypted file system element container as a condition of reauthorization. In another example, the encrypted file system element containers may be deleted 7020-2. In another example, in a case in which the system clock was tampered with, the system may provide the container application with an indication of what the system time was before the change. The system may reset the TTL and key expiry based upon the new time and how much time remained before the time change at 7020-3.

Figure 8:
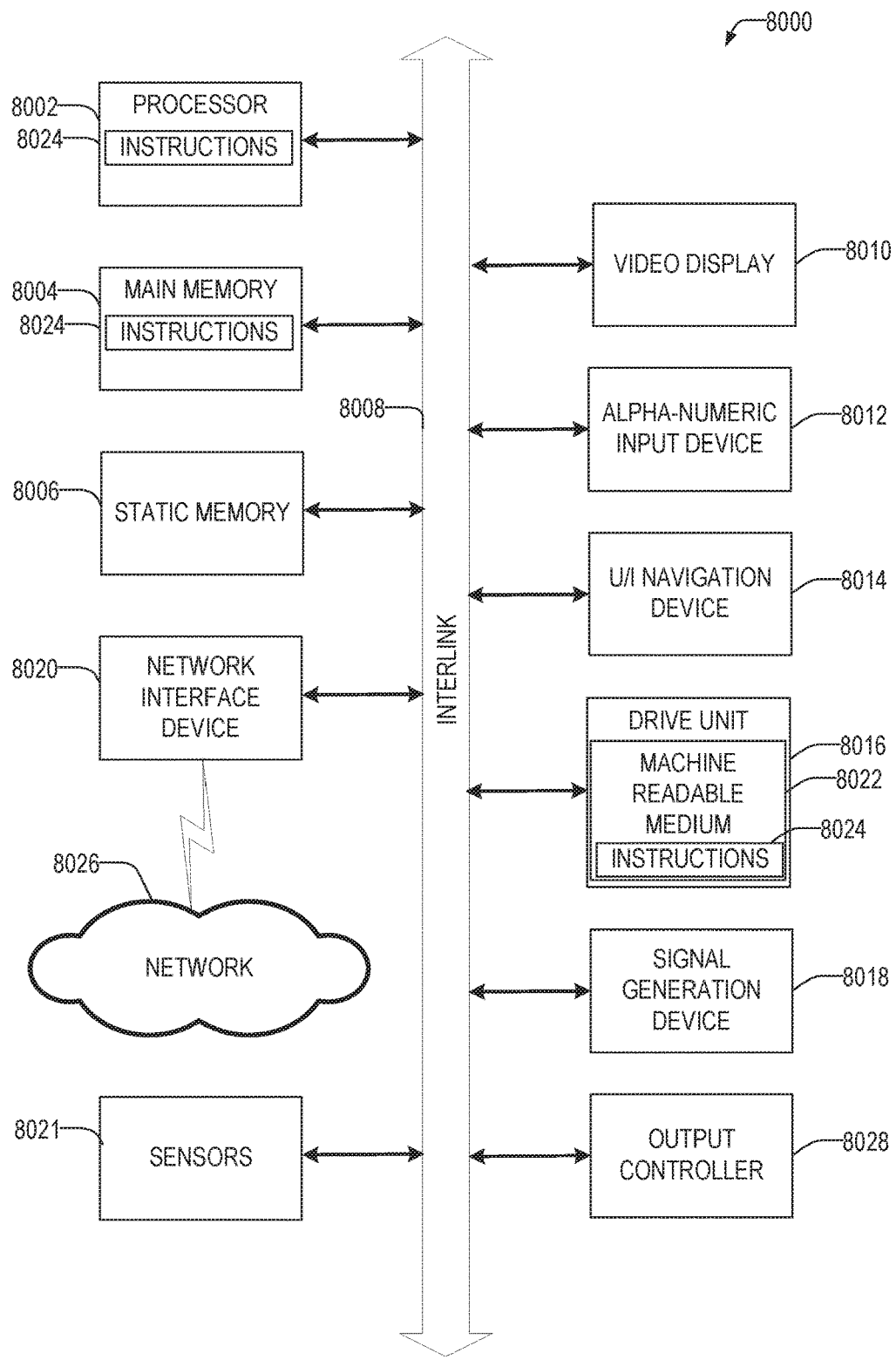
FIG. 8 illustrates a block diagram of an example machine upon which any one or more of the techniques (e.g., methodologies) discussed herein may perform.

FIG. 8 illustrates a block diagram of an example machine 8000 upon which any one or more of the techniques (e.g., methodologies) discussed herein may perform. In alternative embodiments, the machine 8000 may operate as a standalone device or may be connected (e.g., networked) to other machines. In a networked deployment, the machine 8000 may operate in the capacity of a server machine, a client machine, or both in server-client network environments. In an example, the machine 8000 may act as a peer machine in peer-to-peer (P2P) (or other distributed) network environment. The machine 8000 may be, or be a part of, a computing device (e.g., computing device 1110), a network based file storage system (e.g., 1010), personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Machine 8000 may implement the methods of FIGS. 2-7. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, applications, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 8000 may include a hardware processor 8002 (e.g., a central processing unit (CPU), a graphics processing unit (GPU), a hardware processor core, or any combination thereof), a main memory 8004 and a static memory 8006, some or all of which may communicate with each other via an interlink (e.g., bus) 8008. The machine 8000 may further include a display unit 8010, an alphanumeric input device 8012 (e.g., a keyboard), and a user interface (UI) navigation device 8014 (e.g., a mouse). In an example, the display unit 8010, input device 8012 and UI navigation device 8014 may be a touch screen display. The machine 8000 may additionally include a storage device (e.g., drive unit) 8016, a signal generation device 8018 (e.g., a speaker), a network interface device 8020, and one or more sensors 8021, such as a global positioning system (GPS) sensor, compass, accelerometer, or other sensor. The machine 8000 may include an output controller 8028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 8016 may include a machine readable medium 8022 on which is stored one or more sets of data structures or instructions 8024 (e.g., software) embodying or utilized by any one or more of the techniques or functions described herein. The instructions 8024 may also reside, completely or at least partially, within the main memory 8004, within static memory 8006, or within the hardware processor 8002 during execution thereof by the machine 8000. In an example, one or any combination of the hardware processor 8002, the main memory 8004, the static memory 8006, or the storage device 8016 may constitute machine readable media.

While the machine readable medium 8022 is illustrated as a single medium, the term "machine readable medium" may include a single medium or multiple media (e.g., a centralized or distributed database, and/or associated caches and servers) configured to store the one or more instructions 8024.

The term "machine readable medium" may include any medium that is capable of storing, encoding, or carrying instructions for execution by the machine 8000 and that cause the machine 8000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 8024 may further be transmitted or received over a communications network 8026 using a transmission medium via the network interface device 8020. The Machine 8000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 8020 may include one or more physical jacks (e.g., Ethernet, coaxial, or phone jacks) or one or more antennas to connect to the communications network 8026. In an example, the network interface device 8020 may include a plurality of antennas to wirelessly communicate using at least one of single-input multiple-output (SIMO), multiple-input multiple-output (MIMO), or multiple-input single-output (MISO) techniques. In some examples, the network interface device 8020 may wirelessly communicate using Multiple User MIMO techniques.

Other Notes and Examples

Example 1 is a method for securing file system elements, the method comprising: using one or more computer processors on a computing device, performing operations comprising: receiving through a Graphical User Interface (GUI) a selection of a set of one or more file system elements available for downloading from a network based file storage system; sending the set of one or more file system elements to the network based file storage system; receiving an encrypted file system element container and a cryptographic key, the encrypted file system element container comprising the set of one or more file system elements and encrypted such that the cryptographic key decrypts the encrypted file system element container; storing the encrypted file system element container and the cryptographic key in non-volatile storage; determining a time-to-live (TTL) of the encrypted file system element container from information received from the network based file storage system; providing access to a file system element in the encrypted file system element container through a viewer application by decrypting a copy of the encrypted file system element container stored in volatile storage with the key, responsive to a user selection; and responsive to expiry of the TTL, deleting the encrypted file system element container.

In Example 2, the subject matter of Example 1 optionally includes wherein the viewer application does not allow editing of the file system element and wherein the viewer application does not create a cached copy of the file system element that lasts beyond a viewing session of the user.

In Example 3, the subject matter of any one or more of Examples 1-2 optionally include wherein the encrypted file system element container comprises an executable virtual machine which, when executed, isolates the encrypted file system element container from other processes on the computing device.

In Example 4, the subject matter of any one or more of Examples 1-3 optionally include determining an expiry of the cryptographic key; and upon expiry of the cryptographic key, deleting the cryptographic key.

In Example 5, the subject matter of Example 4 optionally includes wherein the encrypted file system element container is retained in non-volatile storage responsive to deleting the cryptographic key; and wherein the method further comprises attempting to re-obtain the cryptographic key by requesting it from the network based file storage system.

In Example 6, the subject matter of any one or more of Examples 1-5 optionally include responsive to receiving the encrypted file system element container, calculating a file fingerprint for the encrypted file system element container; and responsive to deleting the file system element container, searching non-volatile storage on the computing device for the fingerprint and deleting any matches.

In Example 7, the subject matter of any one or more of Examples 1-6 optionally include tracking events of a file system of the computing device corresponding to the encrypted file system element container; and wherein deleting the encrypted file system element container comprises deleting all copies of the encrypted file system element container based upon the tracking.

Example 8 is a system for secure file system elements, the system comprising: a processor; a memory, the memory communicatively coupled to the processor and comprising instructions, which when executed by the processor, cause the system to perform operations comprising: receiving through a Graphical User Interface (GUI) a selection of a set of one or more file system elements available for downloading from a network based file storage system; sending the set of one or more file system elements to the network based file storage system; receiving an encrypted file system element container and a cryptographic key, the encrypted file system element container comprising the set of one or more file system elements and encrypted such that the cryptographic key decrypts the encrypted file system element container; storing the encrypted file system element container and the cryptographic key in non-volatile storage; determining a time-to-live (TTL) of the encrypted file system element container from information received from the network based file storage system; providing access to a file system element in the encrypted file system element container through a viewer application by decrypting a copy of the encrypted file system element container stored in volatile storage with the key, responsive to a user selection; and responsive to expiry of the TTL, deleting the encrypted file system element container.

In Example 9, the subject matter of Example 8 optionally includes wherein the viewer application does not allow editing of the file system element and wherein the viewer application does not create a cached copy of the file system element that lasts beyond a viewing session of the user.

In Example 10, the subject matter of any one or more of Examples 8-9 optionally include wherein the encrypted file system element container comprises an executable virtual machine which, when executed, isolates the encrypted file system element container from other processes on the computing device.

In Example 11, the subject matter of any one or more of Examples 8-10 optionally include wherein the operations further comprise: determining an expiry of the cryptographic key; and upon expiry of the cryptographic key, deleting the cryptographic key.

In Example 12, the subject matter of Example 11 optionally includes wherein the encrypted file system element container is retained in non-volatile storage responsive to deleting the cryptographic key; and wherein the operations further comprise attempting to re-obtain the cryptographic key by requesting it from the network based file storage system.

In Example 13, the subject matter of any one or more of Examples 8-12 optionally include wherein the operations further comprise: responsive to receiving the encrypted file system element container, calculating a file fingerprint for the encrypted file system element container; and responsive to deleting the file system element container, searching non-volatile storage on the computing device for the fingerprint and deleting any matches.

In Example 14, the subject matter of any one or more of Examples 8-13 optionally include wherein the operations further comprise: tracking events of a file system of the computing device corresponding to the encrypted file system element container, and wherein the operations of deleting the encrypted file system element container comprise operations to delete all copies of the encrypted file system element container based upon the tracking.

Example 15 is a non-transitory computer readable storage medium comprising instructions, which when executed by a computing device, cause the computing device to perform operations comprising: receiving through a Graphical User Interface (GUI) a selection of a set of one or more file system elements available for downloading from a network based file storage system; sending the set of one or more file system elements to the network based file storage system; receiving an encrypted file system element container and a cryptographic key, the encrypted file system element container comprising the set of one or more file system elements and encrypted such that the cryptographic key decrypts the encrypted file system element container; storing the encrypted file system element container and the cryptographic key in non-volatile storage; determining a time-to-live (TTL) of the encrypted file system element container from information received from the network based file storage system; providing access to a file system element in the encrypted file system element container through a viewer application by decrypting a copy of the encrypted file system element container stored in volatile storage with the key, responsive to a user selection; and responsive to expiry of the TTL, deleting the encrypted file system element container.

In Example 16, the subject matter of Example 15 optionally includes wherein the viewer application does not allow editing of the file system element and wherein the viewer application does not create a cached copy of the file system element that lasts beyond a viewing session of the user.

In Example 17, the subject matter of any one or more of Examples 15-16 optionally include wherein the encrypted file system element container comprises an executable virtual machine which, when executed, isolates the encrypted file system element container from other processes on the computing device.

In Example 18, the subject matter of any one or more of Examples 15-17 optionally include wherein the operations further comprise: determining an expiry of the cryptographic key; and upon expiry of the cryptographic key, deleting the cryptographic key.

In Example 19, the subject matter of Example 18 optionally includes wherein the encrypted file system element container is retained in non-volatile storage responsive to deleting the cryptographic key; and wherein the operations further comprise attempting to re-obtain the cryptographic key by requesting it from the network based file storage system.

In Example 20, the subject matter of any one or more of Examples 15-19 optionally include wherein the operations further comprise: responsive to receiving the encrypted file system element container, calculating a file fingerprint for the encrypted file system element container; and responsive to deleting the file system element container, searching non-volatile storage on the computing device for the fingerprint and deleting any matches.

In Example 21, the subject matter of any one or more of Examples 15-20 optionally include wherein the operations further comprise: tracking events of a file system of the computing device corresponding to the encrypted file system element container; and wherein the operations of deleting the encrypted file system element container comprise operations to delete all copies of the encrypted file system element container based upon the tracking.

What is claimed is:

1. A method for securing file system elements, the method comprising:
   using one or more computer processors on a computing device, performing operations comprising:
   receiving through a Graphical User Interface (GUI) a selection of a set of one or more file system elements available for downloading from a network based file storage system;
   sending the selection of the set of one or more file system elements to the network based file storage system;
   receiving an encrypted file system element container and a cryptographic key, the encrypted file system element container comprising the set of one or more file system elements and encrypted such that the cryptographic key decrypts the encrypted file system element container;
   storing the encrypted file system element container and the cryptographic key, the cryptographic key having a key validity time period that specifies when the cryptographic key is to be deleted;
   determining a time-to-live (TTL) of the encrypted file system element container from information received from the network based file storage system, the TTL specifying when the encrypted file system element container is to be deleted, the TTL larger than the key validity time period;
   providing access to a file system element in the encrypted file system element container through a viewer application by decrypting a copy of the encrypted file system element container stored in volatile storage with the cryptographic key, responsive to a user selection;
   identifying, after providing access, that the validity time period of the cryptographic key has expired, and in response:
      deleting the cryptographic key, but retaining the file system element container;
      requesting a new cryptographic key from the network based file storage system; and
      receiving the new cryptographic key;
   providing a second access to the file system element in the encrypted file system element container through the viewer application by decrypting a copy of the encrypted file system element container stored in volatile storage with the new cryptographic key, responsive to a second user selection;
   identifying after the second access to the file system element that the TTL has expired; and
   responsive to expiry of the TTL, deleting the encrypted file system element container.

2. The method of claim 1, wherein the viewer application does not allow editing of the file system element and wherein the viewer application does not create a cached copy of the file system element that lasts beyond a viewing session of a user.

3. The method of claim 1, wherein the encrypted file system element container comprises an executable virtual machine which, when executed, isolates the encrypted file system element container from other processes on the computing device.

4. The method of claim 1, further comprising:
   responsive to receiving the encrypted file system element container, calculating a file fingerprint for the encrypted file system element container; and
   responsive to deleting the file system element container, searching non-volatile storage on the computing device for the fingerprint and deleting any matches.

5. The method of claim 1, further comprising:
   tracking events of a file system of the computing device corresponding to the encrypted file system element container; and
   wherein deleting the encrypted file system element container comprises deleting all copies of the encrypted file system element container based upon the tracking.

6. A system for secure file system elements, the system comprising:
   a processor;
   a memory, the memory communicatively coupled to the processor and comprising instructions, which when executed by the processor, cause the system to perform operations comprising:
   receiving through a Graphical User Interface (GUI) a selection of a set of one or more file system elements available for downloading from a network based file storage system;
   sending the selection of the set of one or more file system elements to the network based file storage system;
   receiving an encrypted file system element container and a cryptographic key, the encrypted file system element container comprising the set of one or more file system elements and encrypted such that the cryptographic key decrypts the encrypted file system element container;
   storing the encrypted file system element container and the cryptographic key, the cryptographic key having a key validity time period that specifies when the cryptographic key is to be deleted;
   determining a time-to-live (TTL) of the encrypted file system element container from information received from the network based file storage system, the TTL specifying when the encrypted file system element container is to be deleted, the TTL larger than the key validity time period;
   providing access to a file system element in the encrypted file system element container through a viewer application by decrypting a copy of the encrypted file system element container stored in volatile storage with the cryptographic key, responsive to a user selection;
   identifying, after providing access, that the validity time period of the cryptographic key has expired, and in response:
      deleting the cryptographic key, but retaining the file system element container;
      requesting a new cryptographic key from the network based file storage system; and
      receiving the new cryptographic key;
   providing a second access to the file system element in the encrypted file system element container through the viewer application by decrypting a copy of the encrypted file system element container stored in volatile storage with the new cryptographic key, responsive to a second user selection;
   identifying after the second access to the file system element that the TTL has expired; and
   responsive to expiry of the TTL, deleting the encrypted file system element container.

7. The system of claim 6, wherein the viewer application does not allow editing of the file system element and wherein the viewer application does not create a cached copy of the file system element that lasts beyond a viewing session of a user.

8. The system of claim 6, wherein the encrypted file system element container comprises an executable virtual machine which, when executed, isolates the encrypted file system element container from other processes on the processor.

9. The system of claim 6, wherein the operations further comprise:
 responsive to receiving the encrypted file system element container, calculating a file fingerprint for the encrypted file system element container; and
 responsive to deleting the file system element container, searching non-volatile storage for the fingerprint and deleting any matches.

10. The system of claim 6, wherein the operations further comprise:
 tracking events of a file system that correspond to the encrypted file system element container; and
 wherein the operations of deleting the encrypted file system element container comprise operations to delete all copies of the encrypted file system element container based upon the tracking.

11. A non-transitory computer readable storage medium comprising instructions, which when executed by a computing device, cause the computing device to perform operations comprising:
 receiving through a Graphical User Interface (GUI) a selection of a set of one or more file system elements available for downloading from a network based file storage system;
 sending the selection of the set of one or more file system elements to the network based file storage system;
 receiving an encrypted file system element container and a cryptographic key, the encrypted file system element container comprising the set of one or more file system elements and encrypted such that the cryptographic key decrypts the encrypted file system element container;
 storing the encrypted file system element container and the cryptographic key, the cryptographic key having a key validity time period that specifies when the cryptographic key is to be deleted;
 determining a time-to-live (TTL) of the encrypted file system element container from information received from the network based file storage system, the TTL specifying when the encrypted file system element container is to be deleted, the TTL larger than the key validity time period;
 providing access to a file system element in the encrypted file system element container through a viewer application by decrypting a copy of the encrypted file system element container stored in volatile storage with the cryptographic key, responsive to a user selection;
 identifying, after providing access, that the validity time period of the cryptographic key has expired, and in response:
  deleting the cryptographic key, but retaining the file system element container;
  requesting a new cryptographic key from the network based file storage system; and
  receiving the new cryptographic key;
 providing a second access to the file system element in the encrypted file system element container through the viewer application by decrypting a copy of the encrypted file system element container stored in volatile storage with the new cryptographic key, responsive to a second user selection;
 identifying after the second access to the file system element that the TTL has expired; and
 responsive to expiry of the TTL, deleting the encrypted file system element container.

12. The non-transitory computer readable storage medium of claim 11, wherein the viewer application does not allow editing of the file system element and wherein the viewer application does not create a cached copy of the file system element that lasts beyond a viewing session of a user.

13. The non-transitory computer readable storage medium of claim 11, wherein the encrypted file system element container comprises an executable virtual machine which, when executed, isolates the encrypted file system element container from other processes on the computing device.

14. The non-transitory computer readable storage medium of claim 11, wherein the operations further comprise:
 responsive to receiving the encrypted file system element container, calculating a file fingerprint for the encrypted file system element container; and
 responsive to deleting the file system element container, searching non-volatile storage on the computing device for the fingerprint and deleting any matches.

15. The non-transitory computer readable storage medium of claim 11, wherein the operations further comprise:
 tracking events of a file system of the computing device corresponding to the encrypted file system element container; and
 wherein the operations of deleting the encrypted file system element container comprise operations to delete all copies of the encrypted file system element container based upon the tracking.

* * * * *

UNITED STATES PATENT AND TRADEMARK OFFICE
CERTIFICATE OF CORRECTION

PATENT NO. : 10,496,610 B2
APPLICATION NO. : 15/451621
DATED : December 3, 2019
INVENTOR(S) : Orloff et al.

Page 1 of 1

It is certified that error appears in the above-identified patent and that said Letters Patent is hereby corrected as shown below:

In the Specification

In Column 15, Line 66, delete "container," and insert --container;-- therefor

Signed and Sealed this
Fifth Day of January, 2021

Andrei Iancu
*Director of the United States Patent and Trademark Office*